(12) United States Patent
Risse et al.

(10) Patent No.: US 7,651,560 B2
(45) Date of Patent: Jan. 26, 2010

(54) ABHESIVE LAYER OF CROSS-LINKED NANOPARTICLES

(75) Inventors: Gunter Risse, Dresden (DE); Michael Koch, Cossebaude (DE)

(73) Assignee: Koenig & Bauer AG, Wurzburg (DE)

( * ) Notice: Subject to any disclaimer, the term of this patent is extended or adjusted under 35 U.S.C. 154(b) by 71 days.

(21) Appl. No.: 11/295,045

(22) Filed: Dec. 6, 2005

(65) Prior Publication Data

US 2009/0169865 A1 Jul. 2, 2009

(30) Foreign Application Priority Data

Dec. 20, 2004 (DE) .................. 10 2004 061 137

(51) Int. Cl.
C09D 183/02 (2006.01)
C09D 183/04 (2006.01)

(52) U.S. Cl. .............. 106/287.12; 106/287.13; 106/287.16; 525/477; 525/478; 528/15; 528/24; 528/25; 528/27; 528/31; 528/32; 399/239

(58) Field of Classification Search .............. None
See application file for complete search history.

(56) References Cited

U.S. PATENT DOCUMENTS

| | | | |
|---|---|---|---|
| 2,445,794 A | 7/1948 | Marsden | |
| 2,448,265 A | 8/1948 | Kagy et al. | |
| 4,746,366 A | 5/1988 | Philipp et al. | |
| 5,215,801 A | 6/1993 | Wong | |
| 5,330,836 A | 7/1994 | Buese et al. | |
| 5,370,930 A | 12/1994 | Ito | |
| 5,766,680 A | 6/1998 | Schimdt et al. | |
| 6,008,285 A | 12/1999 | Kasemann et al. | |
| 6,162,498 A | 12/2000 | Mennig et al. | |
| 6,361,868 B1 | 3/2002 | Bier et al. | |
| 6,387,452 B1 | 5/2002 | Benayoun et al. | |
| 6,413,446 B1 * | 7/2002 | Mechtel et al. | 252/181 |
| 2003/0194561 A1 | 10/2003 | Bier et al. | |
| 2004/0068047 A1 * | 4/2004 | Chao | 524/588 |
| 2004/0110012 A1 | 6/2004 | Bier et al. | |
| 2004/0247899 A1 | 12/2004 | Bier et al. | |

FOREIGN PATENT DOCUMENTS

| | | | |
|---|---|---|---|
| CA | 2 289 137 | * | 11/2000 |
| DE | 35 35 283 A1 | | 4/1987 |
| DE | 689 12 024 T2 | | 6/1994 |
| DE | 197 46 885 A1 | | 6/1999 |
| DE | 198 50 968 A1 | | 5/2000 |
| DE | 100 48 259 A1 | | 4/2002 |
| EP | 0 757 079 A1 | | 2/1997 |
| EP | 1000989 A2 | * | 5/2000 |
| EP | 1340616 A2 | * | 9/2003 |

OTHER PUBLICATIONS

Definitions for "sol" and "colloid chemistry" as provided by Hawley's Condensed Chemical Dictionary, 14$^{th}$ Edition.*
Stefan Bachmann, "Development of new stationary phases on the basis of organic/inorganic hybrid materials Spectroscopic characterization and application in chromatography" (Ph.D. thesis, Eberhard-Karls University Tübingen, 2001).

* cited by examiner

*Primary Examiner*—Marc S Zimmer
(74) *Attorney, Agent, or Firm*—Goodwin Procter LLP

(57) ABSTRACT

The invention relates to an abhesive layer and to a method for producing an abhesive coating from cross-linked inorganic nanosols.

It is an object of the invention to develop an abhesive layer, which has a strong abhesive effect especially with respect to adhesive liquids or pastes, such as printing inks and, while adhering well to the coated materials, has an improved, wear resistance.

This objective is accomplished by an abhesive layer or abhesive coating of cross-linked inorganic nanosols with additions of polyorganosiloxanes, which form a three-dimensional network in the layer.

12 Claims, No Drawings

ABHESIVE LAYER OF CROSS-LINKED NANOPARTICLES

The invention relates to an abhesive layer and to a method for producing an abhesive coating from cross-linked inorganic nanosols.

Such layers may be advantageous, for example, for ink-rejecting coatings of parts of a printing press, which come into contact with freshly printed surfaces and the function or printing quality of which could be affected by deposits of printing ink, such as cylinders or elements guiding printing stock. The coating of release paper for the continuous abhesive coating of long paper webs or of polymer films or the employment as an aid for the release of molded objects from press molds represent further areas of use. The inventive abhesive layer is also suitable for facilitating the removability of water, ice or dirt from glass panes, the surfaces of vehicles or from sanitary facilities or for reducing deposits greatly.

Abhesive layers are known, for which the abhesive properties are realized by using silicone. The concept of "silicone" characterizes an extensive group of synthetic polymeric compounds, in which the silicon atoms are linked by way of oxygen atoms and the remaining valencies of the silicon are satisfied by hydrocarbon groups. Polyorganosiloxanes is a different name for silicones.

In abhesive layers, polyorganosiloxanes are used in different forms, for example, as part of polymer mixtures, as an additive in coating mixtures, as a component of copolymers or also without further additions in pure form.

Abhesive coatings with lacquers are known, to which polyorganosiloxanes are added in order to produce the abhesive properties (DE 35 35 283 A1). It is a disadvantage of these coatings that high concentrations of polyorganosiloxane are required in order to achieve a noticeable abhesive effect. The dilution of the binder components of the lacquer, associated therewith, leads to deterioration in the properties of the lacquer and to a decreased mechanical stability of the layers produced therewith.

Coatings of block copolymers of polyorganosiloxanes and organic polymers, such as vinyl polymers or polyacrylates or polymethacrylates, are also known (U.S. Pat. No. 5,370,930). The proportion of polysiloxanes in these materials must exceed 80%, so that these materials achieve adequate abhesive properties.

Furthermore, abhesive coatings are known, to which an additive is added, which consists of a polymer with polydiorganosiloxane side chains, which constitute up to 25% by weight of the polymer (DE 100 48 259 A1). Polyorganosiloxanes frequently have a limited solubility in coating compositions, in which the polyorganosiloxanes are present in a high concentration in addition to other polymers or colloidal particles. These solutions therefore tend to be unstable, and the composition tends to demix or gel prematurely.

In DE 198 50 968 A1, an abhesive layer of polyorganosiloxanes (especially of polyhydrogenmethylsiloxane), which do not contain further polymeric additives and which are cured at temperatures between 100° and 170° C., is proposed. In a known method, the cross-linking of polysiloxanes takes place with involvement of vinyl groups in the presence of platinum-containing or tin-containing catalysts (U.S. Pat. No. 6,387,452). The ready-for-use coating mixtures have a limited shelf life in the uncrosslinked state of about 10 hours to a maximum of 24 hours. This has a negative effect on the economic efficiency of the coating and limits its range of uses.

The DE 689 12 024 T2 discloses the use of hybrid-functional polyorganosiloxanes for producing silicon release coatings. In this connection, hybrid-functional polyorganosiloxanes are reacted with compounds, which have functional groups with multiple bonds. A platinum-containing catalysts is used to activate this reaction.

Likewise, the use of the peroxides for cross-linking polysiloxanes is known (U.S. Pat. No. 2,448,265). For this method, the presence in the reaction mixture of compounds with vinyl groups, which improve the efficiency of the cross-linking, is advantageous (U.S. Pat. No. 2,445,794). It is a particular disadvantage of pure polysiloxane layers that their resistance to abrasive stresses is inadequate.

The abhesive properties of pure polyorganosiloxane layers result in adhesion problems on the materials, which are to be coated. In the case of metallic substrates, an attempt is made to solve this problem by configuring the surface of the substrates so that the abhesive layer is anchored as strongly as possible (DE 198 50 968 A1).

U.S. Pat. No. 5,215,801 discloses an abhesive layer of a silicone resin, to which silica powder has been added with the objective of increasing the adhesion of the layer on the respective substrate. Polyorganosiloxane layers, into which silica particles have been mixed as a filler and to the surface of which compounds have been coupled chemically, which have reactive, functional groups, are disclosed in U.S. Pat. No. 5,330,836. These functional groups are intended to bond the silica particles chemically to the polyorganosiloxane and, with that, bring about overall a better cross-linking in the layer.

Abhesive layers, which use inorganic nanosols and to which hydrophobizing or oleophobizing additives have been added, have also been proposed. The additives are hydrolysis products of long-chain trialkoxysilanes R—SiO(OR)3 or dialkoxysilanes R—Si(OR)2, R containing 4 to 18 carbon atoms in alkyl, aryl, hydroxyalkyl, epoxy or polyether groups. Moreover, polysiloxanes with terminal alkyl, aryl, hydroxyalkyl, epoxy or polyether groups can also be used as additives.

The abhesive properties of the layers, produced therewith, are brought about by the content of compounds with long hydrocarbon chains or by polyorganosiloxanes. This effect of said compounds is brought about by their ability to lower the polar portion of the surface energy of the layers. It is a disadvantage that the mechanical stability of the layers decreases greatly as the content of compounds with long hydrocarbon chains or polyorganosiloxane increases. For this reason, only a relatively small amount of additives can be added especially to layers, which are exposed to an abrasive action. With that, the abhesive properties of these layers are also limited. Therefore, when inorganic sols, which are modified by means of said additives, are used, layers are obtained, which have inadequate wear resistance or an inadequate abhesive effect for some areas of use. Aside from the limited amount of inorganic components, the high proportion of polar inorganic compounds also has a negative effect on the abhesive properties.

It is an object of the invention, to develop an abhesive layer, which has a strong abhesive effect especially with respect to adhesive liquids or pastes, such as, for example, printing inks, and which, while having good adhesion on the coated material, has an improved wear resistance.

This objective is accomplished with the abhesive layer characterized in the first claim or with the method of producing an abhesive coating characterized in the fifth claim. The abhesive layer and the abhesive coating are prepared by the well-known sol-gel method, using inorganic nanosols, to which polyorganosiloxanes have been added, an inorganic composite material resulting, in which, pursuant to the invention, the polyorganosiloxane is also present in a spatially cross-linked form. The composite material accordingly has two interpenetrating three-dimensional networks, an inorganic network with —O—SiO—O— components and a polyorganosiloxane network.

This network structure is the reason why the wear properties are improved over those of the aforementioned, known abhesive layers, in which silica filler particles are mixed, since a composite material, with a spatially structured, inorganic network cannot be obtained by mixing the filler particles described into a silicone resin.

Surprisingly, it has turned out that the composite material described, has strongly abhesive properties already when the polyorganosiloxanes are present in the relatively small amount of 20%. With the therefrom resulting large proportion by volume of the inorganic network, it is possible to achieve wear resistance and adhesive strength on metallic and ceramic substrates, which are significantly better than those of known layers of strictly polyorganosiloxanes, and to achieve abhesive properties, which are comparable. Preferably, the proportion of polyorganosiloxanes in the layer ranges from 20% to 80%. However, applications are also possible in which the proportion of polyorganosiloxanes in the layer is less than 20%.

The inventive abhesive layer or abhesive coating is produced from inorganic nanosols by means of the sol-gel method. To begin with, inorganic particles in the nanometer range (nano particles) are obtained from an alkoxysilane by hydrolysis and partial condensation with the addition of additives. A nanosol is produced by colloidally dispersing the inorganic nanoparticles in an alcohol. The nanosol is modified by the addition of polyorganosiloxanes with multiple bonds and of further additives, which promote cross-linking. In order to increase the wear resistance, the nanosol may be modified additionally with particles of a hard material, after which it is applied on the surface of a carrier material. During a subsequent heat treatment, the solvent is removed and the layer gels and shrinks. At the same time, the inorganic nanoparticles are cross-linked and, parallel to this, the polyorganosiloxanes also form a network, in that, to begin with, chains are formed in the gel and are connected during the further shrinkage of the gel into spatial networks. Organic solvents, alkanols such as butanol are preferred dispersants for the nanosol.

The addition of one or more polyorganosiloxanes, which have groups with multiple bonds, especially vinyl groups and/or epoxy groups, and/or SiH groups, is a prerequisite for the formation of the polyorganosiloxanes network. If an additive, which promotes cross-linking, is added, the cross-linking of the layer-forming agent commences already at ambient temperature, so that a separate heat treatment for fixing and curing the abhesive layer is required only if a higher degree of wear resistance is to be achieved.

For a higher wear resistance, the addition of monomers with functional groups, such as epoxy groups and/or vinyl groups and/or SiH groups, to the nanosol, which support the spatial cross-linking of the components of the layer, is also advantageous. Particles of hard materials are added to the nanosol for applications, for which a particularly high wear resistance to abrasive stresses is required.

It turned out that the shelf life of the nanosol for producing the inventive abhesive layer or abhesive coating of the order of several weeks is much longer than that of conventional silicone resin mixtures due to the dilution effect resulting from the dispersal of the solids in the nanosol.

The abhesive properties of the inventive abhesive layer are particularly pronounced when the total surface energy has a value ranging from 20 to 30 mN/m and the polar portion of the surface energy is less than 5% of the total surface energy. The surface energy can be ascertained easily by contact angle measurements. Since the surface energy is determined essentially by the proportion of the polyorganosiloxanes, the inventive adhesive layer offers, the further advantage that the optimum proportion of polyorganosiloxanes can be ascertained easily with the help of contact angle measurements.

The method of producing the inventive abhesive coating is to be explained in greater detail by means of two examples.

FIRST EXAMPLE

The abhesive coating is produced by the known sol-gel method, the nanosol containing a colloidal dispersion of inorganic nanoparticles with a particle size of between 0.5 nm and 20 nm and preferably of between 0.3 nm and 0.7 nm in butanol. The nanosol is produced by hydrolysis and partial condensation of tetra-ethoxysilane with the addition of additives. The additives are 0.4% dichlorobenzoyl peroxide, 10 ppm of platinum (as hexachloroplatinic acid hydrate), 5% of vinyl methyl siloxane dimethyl siloxane copolymer (with 1% vinyl methyl siloxane), and 2% methylhydropolysiloxane. In addition, one on more monomers, which promote cross-linking, can be added to the nanosol to improve the wear resistance. For this purpose, dimethylmethylsilane, chlorodimethylsilane, octadecylsilane, divinyl-benzene, ethylene glycol dimethacrylate or glycidyl methacrylate, for example, are suitable.

The nanosol, modified by addition of polyorganosiloxanes, is applied on the carrier material, which is to be coated, for example, by means of dipping and drawing and subjected to a thermal treatment. For optimum stabilization of the abhesive coating, the removal of solvent (gelling) and the cross-linking of the layer-forming agents, taking place at the same time, advisably occur at a temperature of 180° C. for a period of about three hours.

If the mechanical stress on the abhesive coating is slight, it is sufficient to cross link the layer-forming agent at ambient temperature because of the cross linking-promoting additives in the nanosol and the ready volatility of the solvent sued.

The spatial cross linking of the polyorganosiloxanes is initiated with the help of peroxides or other free radical starters. It is also possible to form a network of the polyorganoxiloxanes due to the action, for example, of a platinum-containing or tin-containing catalyst with metallic or chemically bound platinum or tin in amounts up to 1,000 ppm. The cross linking is also initiated by initiators for ionic polymerization reactions, which contain Lewis acids, such as aluminum trifluoride.

The heat-treated layer has a strongly repelling effect with respect to adhesive materials, a good scratch resistance as a result of the inorganic network and good resistance to organic solvents.

SECOND EXAMPLE

In a further, advantageous embodiment, the inventive abhesive layer or abhesive coating additionally contains 0.5% of diamond powder or cubic boron nitride with a particle size of 0.1 μm to 5 μm and preferably of 0.7 μm, which is added to a nanosol with the composition given in the first example. The abhesive layer, formed therefrom, has uniformly distributed diamond particles, which provide the layer with an increased stability with respect to abrasive wear, which is required, for example, for devices guiding printing stock in printing presses.

With the help of the surface energy, which is easily accessible by measurement, the amount of polyorganosiloxanes, necessary for a strongly abhesive action of the layer, can be determined by a simple series of experiments in that the surface energy of the abhesive layers and/or coatings produced is determined as a function of the polyorganosiloxane content The total surface energy, to be aimed for to achieve a maximum abhesive effect, should be between 20 and 30 mN/m and the polar surface energy optimally should be less than 2%.

The total surface energy and the polar and nonpolar portions of the surface energy of the inventive layers are determined with the help of contact angle measurements with water as polar liquid and with methylene iodide as nonpolar liquid.

The desired abhesive action advantageously occurs already at a polyorganosiloxanes content of 20%.

The inventive abhesive layers or coatings have a strongly abhesive effect with respect to water and water-based detergents, highly viscous liquids and pastes, such as printing inks or lacquers, as well as with respect to adhesive tapes. Because of very good adhesion and high wear resistance, they are also very suitable for uses, in which they are subjected to mechanical stresses, such as in printing presses for guiding printing stock.

The inventive abhesive coating or layer is also suitable for greatly reducing the adhesion of layers of water or ice on surfaces exposed to the elements, so that these deposits can be removed very easily. The abhesive coating can be used, for example, for keeping glass panes of vehicles, aircraft or ships free of water drops, deposits or ice and for greatly reducing the expense of removing ice and contamination from surfaces. Likewise, the adhesion of water or sewage to sanitary facilities of Fittings is reduced so that lime deposits, for example, can at least be reduced.

For coating surfaces, which are to be protected, the nanosol is applied on the surface to be protected by brushing or spraying and, depending on the thickness of layer that is to be achieved, may be subjected to an intermediate drying. To achieve transparency of the abhesive coating, the layer is polished. As a result of the cross-linking reactions taking place with the evaporation of the solvent, the coating develops pronounced abhesive properties already without any additional heat treatment.

The invention claimed is:

1. Method for producing an abhesive coating from cross-linked inorganic nanoparticles, and additions of polyorganosiloxanes according to the sol-gel method, characterized by the following steps:
    preparation of an inorganic nanosol by the hydrolysis of an alkoxysilane and partial condensation and by colloidally dispersing the inorganic nanoparticles in an alcohol to form the inorganic nanosol,
    modification of the nanosol by the addition of polyorganosiloxanes, wherein one or more of the added polyorganosiloxanes have vinyl groups and/or epoxy groups and/or SiH groups,
    addition of additives which promote crosslinking
    applying the modified nanosol on a surface and
    forming three-dimensional networks of the inorganic nanoparticles and of the polyorganosiloxanes by a heat treatment.

2. The method of claim 1, characterized in that the additives which promote cross-linking include one or more monomers.

3. The method of claim 2, wherein the one or more monomers have epoxy groups and/or vinyl groups and/or SiH groups.

4. The method of claim 1, characterized in that the additives which promote cross-linking include free radical starters, including at least one of peroxides, catalysts, containing platinum metal or tin, and initiators containing Lewis acids.

5. The method of claim 4, characterized in that the additives which promote cross-linking include up to 1000 ppm of platinum in the form of metallic or chemically hound platinum.

6. The method of claim 4, characterized in that the additives which promote cross-linking include up to 1000 ppm of chemically bound tin.

7. The method of claim 1, characterized in that particles of a hard material, with a particle size ranging from 0.1 µm to 5 µm, are added to the modified nanosol.

8. The method of claim 1. characterized by
    the application of the modified nanosol on a surface by means of brushing or spraying,
    drying and/or polishing, and
    forming the three-dimensional networks at ambient temperature.

9. The method of claim 1, wherein the polyorganosiloxanes have functional groups that make cross-linking reactions possible, and of additives, which promote cross-linking.

10. Printing press with a partial abhesive coating formed by a method of producing an abhesive coating from cross-linked inorganic nanoparticles, and additions of polyorganosiloxanes according to the sol-gel method, characterized by the following steps:
    preparation of an inorganic nanosol by the hydrolysis of an alkoxysilane and partial condensation,
    modification of the inorganic nanosol by the addition of polyorganosiloxanes, which have functional groups that make cross linking reactions possible, and of additives which promote crosslinking, wherein one or more of the added polyorganosiloxanes have vinyl groups and/or epoxy groups and/or SiH groups,
    applying the modified nanosol on a surface of said printing press and
    forming three-dimensional networks of the inorganic nanoparticles and of the polyorganosiloxanes by a heat treatment.

11. The printing press of claim 10, wherein the additives which promote crosslinking include one or more monomers having epoxy groups and/or vinyl groups and/or SiH groups.

12. The printing press of claim 10, wherein the preparation of the inorganic nanosol further includes colloidally dispersing the inorganic nanoparticles in an alcohol.

* * * * *